Jan. 29, 1929.  
P. KRUSE  
1,700,134  
HORN SUPPORT FOR CAN SOLDERING MACHINES  
Filed Aug. 1, 1927   2 Sheets-Sheet 1
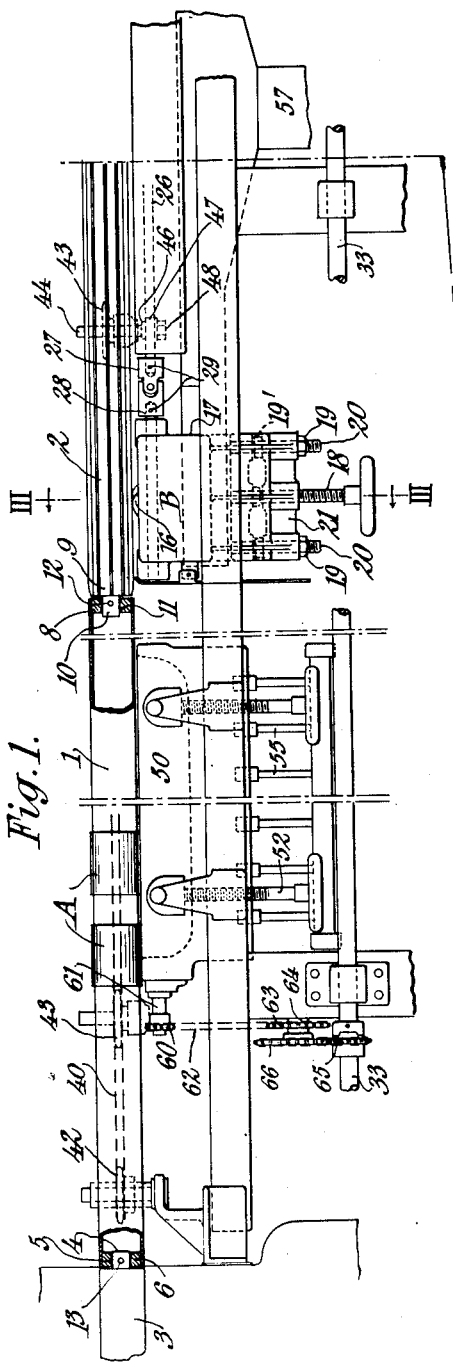
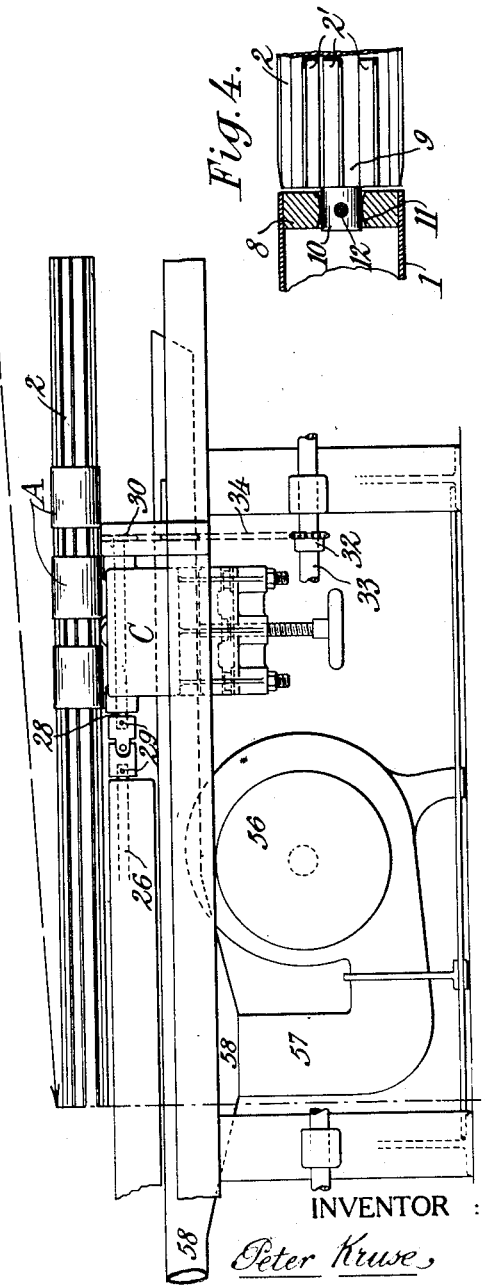
INVENTOR:  
Peter Kruse,  
By Attorneys,

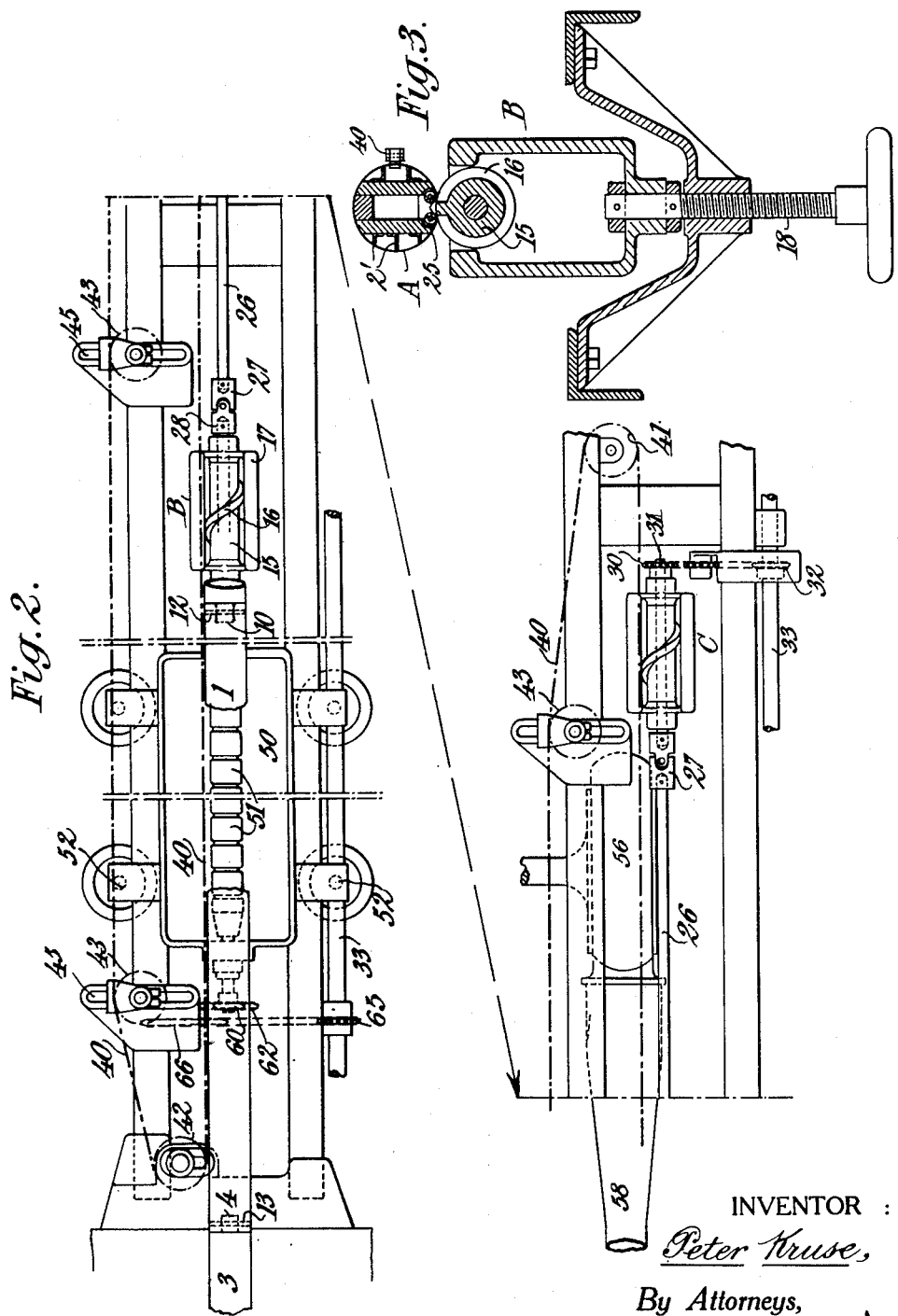

Patented Jan. 29, 1929.

1,700,134

UNITED STATES PATENT OFFICE.

PETER KRUSE, OF BROOKLYN, NEW YORK, ASSIGNOR TO E. W. BLISS COMPANY, NEW YORK, N. Y., A CORPORATION OF DELAWARE.

HORN SUPPORT FOR CAN-SOLDERING MACHINES.

Application filed August 1, 1927. Serial No. 209,808.

This invention relates to a machine for soldering the side seams of can bodies and aims to provide improvements therein.

A particular object of the present invention is to provide an improved horn along which the can bodies are fed, to receive a suitable application of solder at the seams, and upon their subsequent movement along the said horn to be cooled sufficiently to permit of their being handled without danger of disturbing the soldered joint. The solder as first applied and when subjected to heat, softens, and remains so soft for a considerable period that any jarring, or uneven movement will cause the solder to be shaken out of the seam which it should seal. Furthermore, after the solder is partially set so that it can not be shaken from the seam, the strength of the soldered joint may be greatly impaired by even a relatively slight jarring. To obtain the best results the soldered seam or joint should be protected as far as possible against vibration of any kind until the solder is perfectly set, and to this end the present invention aims to provide a combined soldering and cooling horn which will afford a very smooth movement of the soldered can bodies.

Another object of the invention is to provide a two-part articulated horn, the first part supporting the can bodies while they are being soldered, and the second part receiving the can bodies from the soldering part and affording them a sufficient travel to effectively cool them before they pass off the end of the horn; the advantage of this arrangement being that the cooling portion of the horn may be accurately supported at two widely removed points whereby its stability is insured, and any warpage that may occur in the soldering part of the horn will not act upon the cooling portion to throw it out of alignment. It is the articulation between the two parts of the horn which gives this very desirable result. The soldering horn upon being heated, will almost inevitably warp to a certain extent because it is impossible and undesirable to apply the heat uniformly on all sides of the horn. The heat should be localized around the seam portion of the can bodies, and this results in unequal heating of the soldering part of the horn. According to usual practice the soldering horn and cooling horn are made either in a single piece or are rigidly fastened together so that they act as a one-piece horn, and any warpage that occurs along the hot part of the horn necessarily throws the horn out of alignment over its entire length. Therefore, in the past it has been impossible to provide any kind of horn support which could effectively stabilize the horn over the greater part of its length. It has therefore been impossible to provide an effective support at the ends of the horn and also at the center because when the heated part of the horn warps it will move away from one or another of the suports. The maximum heat is usually applied to the lower side of the horn, this having a tendency to cause the horn to bend upwardly at its ends. If a central support were provided, the horn could be maintained in contact with such central support and one end support, but the other end of the horn, because of the warpage, would move upwardly away from its support, with the result that the free end which is then entirely unsupported, vibrates badly. It is obvious that this can not occur in the two-piece horn according to the present invention, the heated portion of which can not throw the cooling part off its supports regardless of how it may warp, the articulation in effect rendering the two parts of the horn wholly independent.

There are several well-known methods for supporting soldering and cooling horns. Two different horn-supporting devices of this kind form the subject-matter of my United States Patents Nos. 1,333,550, granted March 9, 1920, and 1,362,805, granted December 21, 1920, and another horn-supporting device is disclosed in the United States Patent No. 1,317,929, granted to A. Lokan, October 7, 1919. The improvement according to the present invention may be realized with any suitable horn support and is not confined to any known devices for this purpose.

As is well understood by those skilled in the art, the horn support must be operative to continuously sustain the weight of the horn and yet provide free passage for the cylindrical can bodies as they are fed along the horn. The continuously rotating spiral support disclosed in my United States Patent No. 1,333,550 above referred to accomplishes this result in an effective manner and will be hereinafter used by way of example to make clear one embodiment of the present invention. In the following detailed description reference will be had to the accompanying drawings, wherein Figure 1 is a side elevation of the two-part soldering horn, the cooling portion of which is carried upon two spiral supports.

Fig. 2 is a plan view of the device shown in Fig. 1.

Fig. 3 is a cross-section of the same device taken along the section line III—III of Fig. 2.

Fig. 4 is an enlarged fragmentary side elevation showing the articulation between the horn sections.

Referring to the drawings, numeral 1 designates the soldering part or section of the articulated horn according to the present invention, and 2 designates the cooling section of said horn. In accordance with usual practice the end of the soldering horn which receives the can bodies is directly connected to the forming horn 3 of a body-making machine by means of a central pin 4. This central pin fits loosely into the recess 5 formed in the end block 6 of the soldering horn, a sufficient play being provided to permit of the expansion and warping of the solder horn without stressing the forming horn 3. The opposite end of the soldering part of the horn is loosely connected to the cooling horn 2 in a manner similar to the connection with the forming horn or in any other suitable way whereby the necessary articulation between the soldering part 1 and the cooling part 2 is provided. In the construction illustrated, end blocks 8 and 9 in the soldering and cooling horns respectively afford a simple pin and socket connection, the pin 10 projecting centrally from the block 9 into the bore 11 of the block 8. Bore 11 is sufficiently large to freely permit any movement of the soldering horn 1 due to warping, without transmitting such movement to the cooling horn. A transverse pin 12 passes through block 8 and loosely through the central projection of block 9 to prevent relative longitudinal or torsional displacement of the two horns, and a similar pin 13 connects the central pin 4 of the forming horn with the end block 6 at the left-hand end of the soldering horn for a like purpose. The central projections 4 and 8 which hold the horns in alignment are preferably of small diameter to reduce as far as practicable the conduction of heat from the solder horn to the cooling horn and also to the body-forming horn. The walls of bores 5, 11 are rounded, longitudinally as shown in Fig. 4 to insure free articulation of the central horn projections therein.

The soldering and cooling horns may be of any known construction. In the embodiment illustrated, the soldering horn 1 is substantially in the form of a tube, the horn being hollowed out as indicated in Fig. 1. The cooling horn 2 is preferably of the built-up type having a number of ribs 2' which serve to guide the can bodies. The horn is skeletonized in this manner to provide an effective circulation of air within the can bodies, so that they are more quickly cooled in their progress along the horn. The construction of the cooling horn is best illustrated in Fig. 3. In many soldering machines the soldering part of the horn is constructed exactly like the cooling part above described, and this has the advantage of preventing the soldering part from becoming excessively hot. The tubular soldering horn, on the other hand, preserves a somewhat more uniform temperature. As above set forth, either construction may be employed, the soldering and cooling horns in the embodiment shown in the drawings being merely illustrative of one arrangement. There are other well known horn constructions which are equally satisfactory.

A, A designates a series of tubular can bodies which is advanced along the solder and cooling horn in any suitable manner. B and C refer generally to the two horn supports which engage the cooling part 2 of the horn at points sufficiently far apart to insure a stable bearing for such cooling portion. The design of the horn supports B and C should be such that each support has portions which bear successively upon the soldering horn at points which progress longitudinally thereof, in such manner that the can bodies A may pass along the horn without coming between the solder horn and the part of the solder horn support which is acting to support the said horn at any given moment.

As shown in the embodiment illustrated in the accompanying drawings, the supports B and C are substantially alike so that only one of them need be described. The support B comprises a rotating part or hub 15 having a spiral rib or projection 16 thereon. The part 15 is preferably carried in a bracket 17, and means such as a screw shaft 18, is preferably provided for raising and lowering the bracket 17. The bracket is rigidly secured in a desired adjustment by means of locking nuts 19, 19' threaded onto guide rods 20 depending from bracket 17, the said nuts engaging the upper and lower surfaces respectively of a wing 21 which forms part of the frame or bed of the machine. The adjustability of the horn support B permits of the support being brought into position to support horns of different diameters or heights, it being understood that the dimensions of the horn are governed by the size of the can body which is being made.

The underside of the horn may be provided with two spaced rollers 25, 25 (Fig. 3), these rollers minimizing the wear between the horn section 2 and the horn support. The space between the roller 25, 25 or points of contact with the rib 16, provide a stable poise of the horn on the support, and prevents the horn from moving laterally. It will be understood that a serviceable and secure bearing for the horn can be provided without the use of the anti-friction rollers above described.

The rotary elements of the two adjustable supports B and C are connected together by means of a shaft 26, at the ends of which are universal joints 27, the joints being rigidly fastened to the shaft 26 and to the hub extensions 28 of the rotary members 15, 16 which directly support the horn, by means of pins 29.

The rotary supports for the horn may be driven by a chain and sprocket drive as shown to the right in Figs. 1 and 2, a sprocket 30 being mounted rigidly upon the hub extension 31 of the right-hand support C and connected to a sprocket 32 mounted upon the longitudinal driving shaft 33, by means of a chain 34.

The pitch of the spiral rib 16 is such that the maximum size of can body which the machine is designed to form, can be advanced during the revolution of the rotary horn supports a sufficient distance to escape the leading or entering end of the spiral rib as it engages the horn upon the next succeeding revolution. As is well understood in the art, it is highly desirable to prevent the can bodies from coming between the horn and the active horn-supporting element during the advance of such bodies, as the rapid separation or coming together of the horn and its support due to the entering or withdrawal of the material of a can body therebetween gives rise to a jarring action which has a deleterious effect upon the soldered joint.

The spiral horn support above described is merely illustrative of one means for accomplishing the desired result of supporting a horn at points which always lie between successive can bodies as the bodies are advanced along the horn, and it will be understood that any other device for accomplishing this purpose may be utilized according to the present invention. It is only necessary that the cooling section 2 of the articulated solder and cooling horn 1, 2, be supported at two points B and C sufficiently removed to insure the stability of the cooling section of the horn under normal operating conditions. As hereinbefore pointed out, this construction, which permits of a two-point support or suspension of the cooling section of the horn makes possible a substantially stable and accurately positioned cooling horn regardless of the warpage that may occur in the soldering horn 1 connected thereto. In the foregoing description it will be understood that it is immaterial whether the horn elements 1, 2 be considered as articulated sections of a single horn, the first element of which is utilized as a soldering section, and the second element as a cooling section, or whether the elements 1, 2 be considered as two independent horns—one a solder horn and the other a cooling horn. In either case the principle is the same, any heated horn section being articulated to a cooling horn section, and the latter section having two points of support spaced apart longitudinally of the horn affords a construction which is within the scope of the present invention.

The mechanism for advancing the can bodies along the horn sections 1, 2 forms no part of the present invention and may be of any suitable construction. A well known means for accomplishing this result comprises an endless chain which carries at suitable intervals driving lugs to engage successive can bodies and carry them along the horn. The disposition of this chain is indicated diagrammatically by the line 40 in Figs. 1 and 2, the chain being carried over end sprockets 41, 42 and tensioned by means of idler sprockets 43 which are adjustably mounted upon the frame of the machine. These idler sprockets are carried upon vertical spindles 44, the lower ends of which are slidably carried in transverse slots 45. When the idler has been correctly positioned the spindle shoulder 46 is clamped securely against the slotted support 47 and locked in position by means of nuts 48. A similar transverse adjustment for the end spindles 41, 42 is provided so that the chain may be adjusted to feed can bodies of various diameters.

In accordance with usual practice a solder well or trough 50 is provided beneath the solder horn 1 and a solder roll 51 carries the molten solder from the well to the can body seams as the can bodies are moved along the said roll. At either end of the well 50 bearings are provided for the solder roll, and the well itself may be vertically adjusted by screw shafts 52 to bring the roll into contact with the can body seams regardless of the size or disposition of the horn 1 along which the can bodies pass. The solder roll is driven by means of the chain and sprocket connections best shown to the left in Fig. 1. A sprocket 60 carried on the hub extension 61 of soldering roll 51 is connected by chain 62 to a sprocket 63 carried on an intermediate shaft 64. This shaft is driven through a second chain and sprocket connection comprising the sprocket 65 mounted upon the longitudinal driving shaft 33, and the sprocket 66 which is rigidly connected to the intermediate shaft 64. The intermediate shaft is adjustably mounted upon the frame of the machine in any suitable manner whereby the chains connecting sprockets 60, 63 and 65, 66 may be correctly tensioned regardless of the position of sprocket 60, which, as hereinbefore set forth, will occupy various positions in accordance with the adjustment of the soldering roll 51 for can bodies of various diameters. Adjustable chain drives of the above described type are well known to those skilled in the art and so need only be briefly described. The solder in well 50 is maintained in a molten state by means of a plurality of gas burners 55 or in any suitable manner.

The can bodies in passing along the cooling section of the horn are preferably subjected to a cooling draft of air, which, in a well known manner, may be produced by means of a centrifugal blower 56, the blower exhaust 57 being connected to a distributing chamber 58 which conducts the air along the cooling horn and effectively applies the draft to the hottest part of the can bodies.

The operation of the device according to the present invention will be obvious from the foregoing description and need not be particularly set forth, inasmuch as the general operation is typical of soldering machines well known in the art. The most important operative feature according to the present invention, as has already been stated, resides in the articulation of the two horn sections and the stable support of the cooling section. This articulation permits of a perfectly aligned and adequately supported cooling horn regardless of any warping that may occur in the soldering horn and insures a steady and practically vibrationless movement of the can bodies along the horns or horn sections.

While only a single embodiment of the present invention has been described and illustrated, it will be understood that the invention is not limited thereto but may be otherwise variously modified and embodied without departing from the spirit thereof, as set forth in the following claims.

What I claim is:

1. In a can body soldering machine or the like, a solder horn, a cooling horn forming an extension of said solder horn, and a coupling between said horns permitting relative angular displacement between them.

2. In a can body soldering machine or the like, a solder horn, a cooling horn forming an extension of said solder horn, a connection permitting relative angular displacement between said horns, and a plurality of horn supports adapted to maintain the said horns in substantial alignment.

3. In a can body soldering machine or the like, a solder horn, a cooling horn forming an extension of said solder horn, a connection permitting relative angular displacement between said horns, spaced supports engaging the said cooling horn at points longitudinally thereof separated sufficiently to provide a stable bearing for said cooling horn, and an articulated support for said solder horn toward the end thereof removed from the said cooling horn.

4. In a can body soldering machine or the like, a solder horn, a cooling horn, supports for said cooling horn, and a connection between said horns adapted to support one end of the solder horn and to permit relative angular displacement between the solder horn and the cooling horn.

5. In a can body soldering machine or the like, a solder horn, a cooling horn and a body-forming horn, the said solder horn being flexibly supported at its ends by the said body-forming horn and the said cooling horn, respectively.

6. In a can body soldering machine or the like, a solder horn, a cooling horn, rotating spiral supports for said cooling horn, and a flexible joint between said solder horn and said cooling horn whereby one end of the solder horn is connected to and supported by said cooling horn.

7. In a can body soldering machine or the like, a two-part articulated horn, one part of said horn being carried upon moving supports which engage the said horn part at points between the can bodies while said bodies are moved along the horn, and the other part of said horn being supported at one end by the first-mentioned horn part, the connection between said horn parts permitting angular movement between said parts while maintaining the adjacent ends of said parts substantially concentric, whereby the can bodies may be freely shifted along the horn from one part to the other.

8. A can body soldering machine according to claim 7, further characterized in that said movable horn supports comprise rotary spiral members.

9. In a can body soldering machine or the like, a horn along which can bodies are fed, and horn supports of the type adapted to support the horn at points which continuously lie between the moving can bodies, said supports being spaced apart a sufficient distance longitudinally of the horn to prevent said horn from being axially displaced during the normal operation of the machine whereby the horn will be held in working alignment solely through the action of said supports, and a second horn articulated with and forming a continuation of said first-mentioned horn and flexibly supported thereby, whereby to permit relative angular displacement between the adjacent ends of said horns.

10. In a can body soldering machine or the like, a cooling horn along which can bodies are fed, and a pair of horn supports of the type adapted to support the horn at points which continuously lie between the moving can bodies, said supports being spaced apart to provide support for said horn at points on opposite sides of the longitudinal center of gravity of the horn whereby the said horn will be supported in stable longitudinal equilibrium solely through the action of said supports, without any alignment-maintaining support axially engaging either end of the horn.

11. In a can body soldering machine or the like, a cooling horn along which can bodies are fed, and at least two rotary spiral horn supports spaced apart longitudinally of said horn a sufficient distance to maintain said horn in stable equilibrium in the absence of any stationary alignment-maintaining support at either end of the horn.

In witness whereof, I have hereunto signed my name.

PETER KRUSE.